United States Patent [19]

Rushford

[11] Patent Number: 4,726,660

[45] Date of Patent: Feb. 23, 1988

[54] TECHNIQUE FOR COMPRESSING LIGHT INTENSITY RANGES UTILIZING A SPECIFICALLY DESIGNED LIQUID CRYSTAL NOTCH FILTER

[75] Inventor: Michael C. Rushford, Livermore, Calif.

[73] Assignee: The United States of America as represented by the United States Department of Energy, Washington, D.C.

[21] Appl. No.: 863,758

[22] Filed: May 16, 1986

[51] Int. Cl.⁴ .............................................. G02F 1/13
[52] U.S. Cl. ........................... 350/347 E; 350/331 R; 350/342; 350/350 R
[58] Field of Search ............... 350/339 F, 342, 347 E, 350/350 R, 331 R Primary Examiner—Stanley D. Miller
Assistant Examiner—Richard F. Gallivan
Attorney, Agent, or Firm—P. Martin Simpson, Jr.; Clifton E. Clouse, Jr.; Judson R. Hightower

[57] ABSTRACT

A pin hole camera assembly for use in viewing an object having a relatively large light intensity range, for example a crucible containing molten metal in an atomic vapor laser isotope separation (AVLIS) system is disclosed herein. The assembly includes means for optically compressing the light intensity range appearing at its input sufficient to make it receivable and decipherable by a standard video camera. To accomplish this, the assembly utilizes the combination of interference filter and a liquid crystal notch filter. The latter which preferably includes a cholesteric liquid crystal arrangement is configured to pass light at all wavelengths, except a relatively narrow wavelength band which defines the filter's notch, and includes means for causing the notch to vary to at least a limited extent with the intensity of light at its light incidence surface.

16 Claims, 11 Drawing Figures

TECHNIQUE FOR COMPRESSING LIGHT INTENSITY RANGES UTILIZING A SPECIFICALLY DESIGNED LIQUID CRYSTAL NOTCH FILTER

The U.S. Government has rights in this invention pursuant to contract number W-7405-ENG-48 between the U.S. Department of Energy and the University of California for the operation of the Lawrence Livermore National Laboratory.

FIELD OF THE INVENTION

BACKGROUND OF THE INVENTION

The present invention relates generally to techniques for compressing relatively large light intensity ranges and more particularly to a technique which utilizes a specifically designed cholesteric liquid crystal type of notch filter.

There are times when it is desirable to view an object having a relatively large light intensity range and record what is viewed by means of a camera or like instrument. For example, applicant has found a need to view the crucible containing molten metal in an atomic vapor laser isotope separation (AVLIS) system. However, this molten uranium containing crucible functions as a black body having a center which is at a temperature of approximately 4000° K. and an outer temperature on the order of 1000° K. Thus, the temperature range across this black body is approximately 4000° K. and has a correspondingly large light intensity range (nine orders of magnitude) that is much too large for a standard (two-three orders of magnitude) video camera or like instrument to receive and decipher. Therefore, if the standard viewing and/or recording equipment is to be used to view the crucible, its light intensity range must be compressed to a tolerable level.

The concept of compressing a relatively large light intensity range is not new. Heretofore, it has been done electronically, that is, by converting the incoming light to corresponding electrical signals, compressing the electrical signals, and then converting these compressed electrical signals back to light which itself is compressed relative to the incoming light. Applicant has found this "electronic" approach to light compression to be relatively complicated and expensive.

To applicant's knowledge there has been no suggestion of compressing a light intensity range entirely optically, that is, by acting on the light itself rather than converting the light to electric signals which are then compressed and converted back to light. Accordingly, applicant has described in his copending patent application Ser. No. 863,912, entitled TECHNIQUES FOR OPTICALLY COMPRESSING LIGHT INTENSITY RANGES, filed May 16, 1986 an arrangement which includes a liquid crystal notch filter in combination with an interference filter. The liquid crystal notch filter described in that application (which is incorporated herein by reference) is of the general type found in the art, that is, a filter configured to pass light at all wavelengths except for light at a relatively narrow wavelength band which defines the filter's notch. However, as described in that application, the otherwise readily available filter has been modified in a way which causes the wavelength band to vary, at least to a limited extent, with temperature. As will be seen hereinafter, the present invention also provides for a liquid crystal notch filter in combination with an interference filter to provide a system for compressing light intensity ranges. However, as will also be seen, the liquid crystal notch filter disclosed herein is one which utilizes a cholesteric liquid crystal arrangement and which responds directly to light on its incident surface to vary its notch, rather than responding to changes in temperature as in the liquid crystal notch filter described in the above-recited copending patent application.

As just indicated, the present invention utilizes a specifically designed, novel cholesteric liquid crystal arrangement in forming a specifically designed light sensitive notch filter. Their new notch filter is in turn combined with an interference filter, as will be seen, to provide the desired light compression. However, at the outset, it is to be understood that cholesteric liquid crystals generally are known in the art. See for example the article entitled LIQUID CRYSTALS AS LARGER APERTURE WAVE PLATES AND CIRCULAR POLARIZERS by Stephen D. Jacobs, as published in SPIE volume 307-polarizers and applications (1981). Also, the idea of combining cholesteric liquid crystals generally (other than to form a notch filter) with one another and other components such as one-half waveplates is described in a publication entitled CHOLESTERIC FILMS AS OPTICAL FILTERS, as published in the journal of applied physics volume 42, number 10, September 1971.

Still referring to the prior art, it will be seen that a particular embodiment of the present invention utilizes an electric field responsive cholesteric liquid crystal arrangement as part of a specific notch filter. The concept that a cholesteric liquid crystal can have its transmissive properties vary with field changes is generally disclosed in British Pat. No. 1,123,117, granted Aug. 14, 1968. However, there is no suggestion in the British Patent to provide an electric field sensitive notch filter utilizing its cholesteric liquid crystal.

Still other prior art in the field of cholesteric liquid crystals includes U.S. Pat. No. 3,114,836 which discloses a technique for varying the light scattering properties of a cholesteric liquid crystal whereby to convert a heat pattern into a visible pattern and an article entitled APPLICATION OF THE LIQUID CRYSTAL LIGHT VALVE TO REAL-TIME OPTICAL DATA PROCESSING by W. P. Bleha, et al, as published in OPTICAL ENGINEERING, volume 17, number 4, July-August 1978. This latter article describes how a photoconductor received light and alters this applied electic field across a nematic liquid crystal.

SUMMARY OF THE INVENTION

In view of the foregoing, it is an object of the present invention to provide a liquid crystal notch filter which is configured to pass light at all wavelengths except a relatively narrow wavelength band defining the filter's notch and which is configured such that its notch varies to at least a limited extent with the intensity of light at its incident surface.

Another object of the present invention is to provide a liquid crystal notch filter of the last mentioned type which is uncomplicated in design and reliable in use.

Still another object of the present invention is to provide a liquid crystal notch filter of the last mentioned type which utilizes a cholesteric liquid crystal arrangement as one of its components.

A further object of the present invention is to combine the last mentioned liquid crystal notch filter with other components in order to form an overall system for compresing light intensity ranges.

As indicated above, the liquid crystal notch filter disclosed herein is configured to pass light at all wavelengths except a relatively narrow wavelength band which defines its notch. In accordance with the present invention, its notch is caused to vary to at least a limited extent with the intensity of light at its incident surface, independent of the temperature at that surface. In all of the embodiments disclosed herein, the notch filter includes a layer of cholesteric liquid crystal material in combination with other components which together form a cholesteric liquid crystal arrangement. When this arrangement is exposed to light at its incident surface an electric field corresponding in intensity to the intensity of the incident light is applied across the liquid crystal material and determines the position of the notch in the overall filter.

As will be seen hereinafter, the cholesteric liquid crystal type of notch filter just described is combined with an interference filter in the same manner described in the above recited copending patent application in order to provide a system for compressing light intensity ranges.

Additional objects, advantages and novel features of the invention will be set forth in the description which follows and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The various aspects of the present invention recited briefly above will be described in more detail hereinafter in conjunction with the drawings wherein.

DETAILED DESCRIPTION OF THE INVENTION

Reference will now be made to preferred embodiments of the invention, examples of which are illustrated in the accompanying drawings. While the invention will be described in detail in connection with these preferred embodiments, it will be understood that it is not intended to limit the invention to those embodiments. On the contrary, it is intended to cover all alternative modifications and equivalents as may be included within the spirit and scope of the invention as defined by the appended claims.

Figure 1:
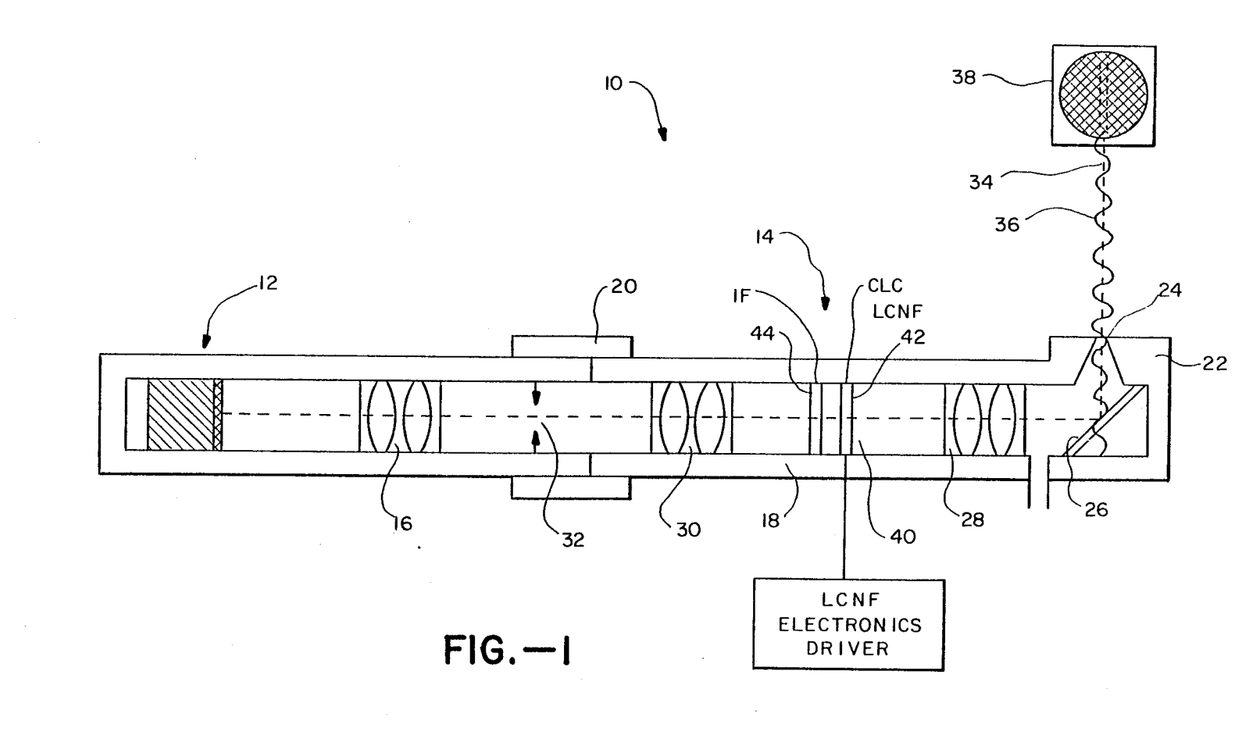
FIG. 1 is a diagrammatic illustration of a pin hole camera including an assembly designed in accordance with the present invention for optically compressing the light intensity range from an object being viewed by the camera.

Turning now specifically to the drawings, attention is first directed to FIG. 1 which illustrates a pin hole camera assembly generally indicated by the reference numeral 10 and including two sections, a camera section 12 and a separate and distinct optical section 14. The camera section, which is only partially shown, may be of any suitable known kind, in its entirety, or it may be identical to the corresponding camera section in applicant's copending U.S. patent application Ser. No. 863,911, filed simultaneously with the present application and entitled PIN HOLE CAMERA ASSEMBLY HAVING X-RAY BLOCKING CAPABILITIES. In either case, the camera section includes a lens assembly or eye piece 16 which may have a fixed focus or one which is variable as in the last mentioned co-pending application. Optics section 14 includes a subsection 18 fixedly mounted in spaced-apart coaxial relationship with the input to camera section 12 by suitable means (not shown) and a subsection 22 which extends perpendicular to subsection 18 and which defines a pinhole aperture 24. The optics section 14 may include any suitable optics to reproduce the aperture on to an entrance pupil image plane 32 of the camera section 12. In the embodiment illustrated, this is accomplished in the same way as the corresponding optics section described in the two above mentioned copending patent applications, specifically by means of an inclined mirror or other suitable light reflecting surface 26 is fixedly disposes at the juncture between subsections 18 and 22 for directing light entering aperture 24 through subsection 18 in the direction of camera section 12. Spaced apart eye pieces 28 and 30 located within subsection 18 act on this light to reproduce an image of the aperture onto pinhole image plane 32.

Inasmuch as overall camera assembly 10 illustrated in FIG. 1 is especially suitable for viewing an object which includes a source of x-radiation, specifically molten uranium in a crucible forming part of an AVLIS system, the light reflecting surface 26 is preferably designed to absorb the x-radiation, as described in the second mentioned copending patent application. In FIG. 1, the visible light entering aperture 24 of optics section 14 is diagrammatically illustrated by dotted lines at 34 while x-radiation entering the aperture is diagrammatically illustrated by wavey line 36. Both are shown emanating from an object 38 being viewed by the camera assembly. Camera assembly 10 is designed especially for viewing an object having a relatively large intensity range, specifically a range which is typically outside the normal capabilities of standard camera equipment to decipher and record. One such object is molten metal in a crucible where the temperature range across the crucible is as high as 4000° K. thereby resulting in a correspondingly large light intensity range (i.e., 9 orders of magnitude). To this end, camera assembly 10 includes a system for compressing the light intensity range being viewed before it reaches camera section 12. This system which is generally indicated at 40 is shown forming part of overall optics section 14.

As will be seen hereinafter, system 40 is designed in accordance with the present invention to include a specifically configured cholesteric liquid crystal type of notch filter in combination with an interference filter which together operate to compress the light intensity range entering camera assembly 10 in the same manner described in the first mentioned copending Rushford patent application. The cholesteric liquid crystal type of notch filter is generally indicated at 42 in FIG. 1 and will be described in more detail hereinafter in conjunction with FIGS. 3–8. The interference filter is generally indicated at 44 in FIG. 1 and may be identical to the downstream interference filter IF$_2$ described in the first mentioned copending Rushford application, that is, a conventional interference filter having a fixed, relatively narrow transmission band. One such interference filter to be used is a model #488FS10-25, Andover Co. Larence, Mass.

Figure 2A:
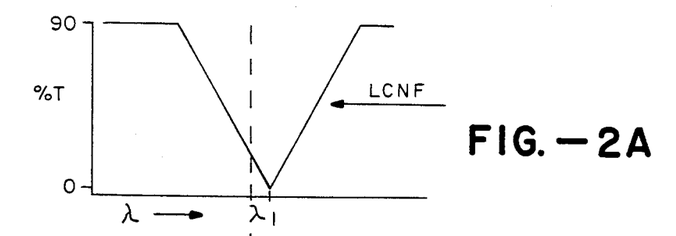
FIGS. 2A, 2B and 2C graphically illustrate how the light compression asssembly forming part of the pin hole camera of FIG. 1 functions.
Figure 2B:
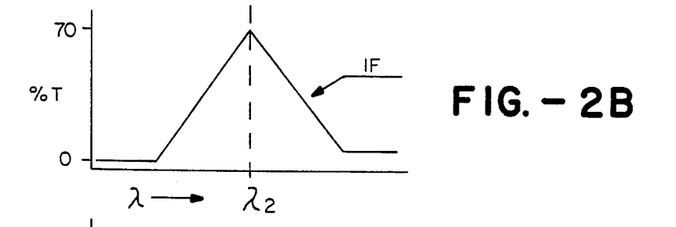
Figure 2C:
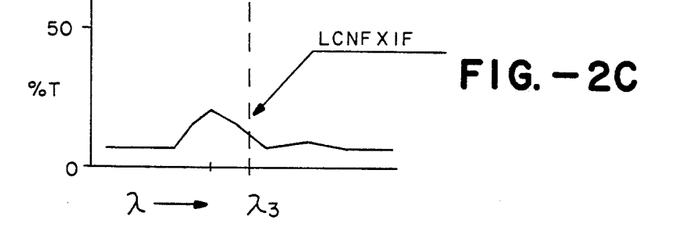

Turning now to FIGS. 2A, 2B and 2C, attention is directed to the way in which overall system 40 functions to compress the light intensity range of light appearing on the front face of the cholesteric liquid crystal notch filter. It may be recalled in the detailed discussion in the first mentioned copending Rushford application that a liquid crystal notch filter per se is one which passes all light, except for light in a very narrow band. For purposes herein, that band will be referred to as the filter's notch and may be designed to fall within a particular wavelength band. In the prior art, specifically a publication entitled CHOLESTRIC FILMS AS OPTICAL FILTERS by James Adam et al; JAP, Vo. 42, No. 10, September (1971) pages 496–498. such a device has included a fixed notch. In the first mentioned Rushford copending application, a liquid crystal notch filter is described in which its notch shifts with changes in temperature at its light incident surface. As will be seen hereinafter, a cholesteric liquid crystal type of notch filter is designed in accordance with the present invention so that each position of its notch (in the wavelength spectrum) is dependent upon the intensity of light at its particular light incident surface, independent of the temperature at that surface.

Figure 3:
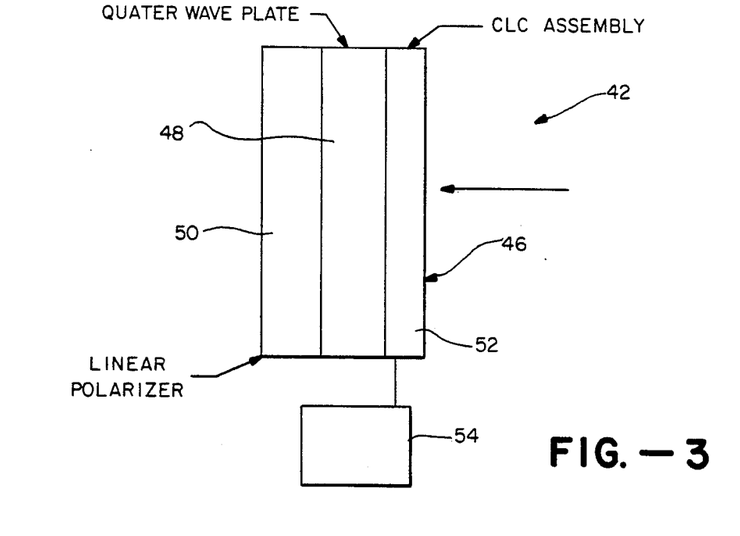
FIG. 3 diagrammatically illustrates a cholesteric liquid crystal type of notch filter which is designed in accordance with the present invention and which forms part of the light compressing assembly shown in FIG. 1.
Figure 6:
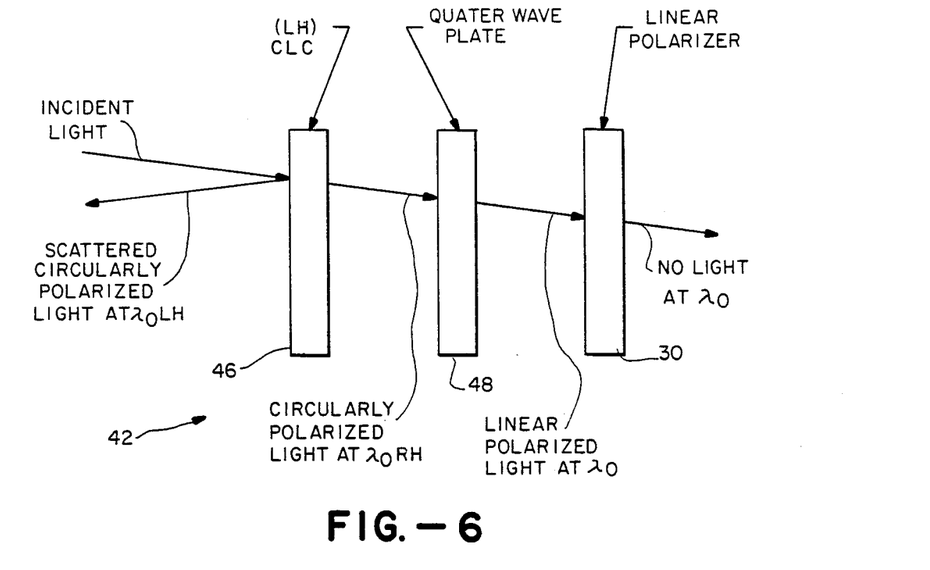
FIG. 6 is a diagrammatic representation of the way in which the cholesteric liquid crystal type notch filter functions as a notch filter.

Before describing the cholesteric liquid crystal type of notch filter 42 designed in accordance with the present invention, attention is breifly directed to the way in which this device combines with the interference filter 44 to compress the light intensity ranges entering the overall camera assembly. In this regard, reference is first made to FIGS. 2A–C. FIG. 2A is a graphic illustration of the light transmissive characteristics of a small section or pixel of the notch filter as a function of wavelength while FIG. 2B is a graphic illustration of the interference filter 44. Note that the notch at $\lambda 1$ associated with the cholesteric liquid crystal type notch filter and the transmission band $\lambda 2$ of the interference filter overlap so as to provide a resultant pass band at $\lambda 3$. As the notch shifts to the left or right from its $\lambda 1$ position in response to changes in the light intensity at its associated pixel, the resultant pass band $\lambda 3$ either increases or decreases. This is described in more detail in the first mentioned Rushford application and reference is made thereto. For purposes of the present disclosure it suffices to say that this type of shift at each pixel making up the light incident face of a notch filter 42 forms the desired light intensity compression capabilities. Having described overall light compression system 40 generally, attention is now directed to the cholesteric liquid crystal type of notch filter 42 in particular. FIGS. 3 and 6 diagrammatically illustrate this device in accordance with a preferred embodiment of the present invention. As shown specifically in FIG. 3, the notch filter includes a cholesteric liquid crystal arrangement 46 in combination with a quarter wave plate 48 and a linear polarizer 50. These latter two components are conventional and may be readily providable. The cholesteric liquid crystal arrangement 46 is itself designed in accordance with the present invention, as will be described in detail hereinafter. For the moment, it suffices to say that this latter device includes a layer of cholesteric liquid crystal material of either left or right handedness and electro-optic means for applying across that layer an electric field which is proportional to the light intensity at the incident surface of the overall cholesteric liquid crystal arrangement. The cholesteric liquid crystal material is configured to pass light of both right and left handedness and at all wavelengths, except for a narrow wavelength band of light which is of the same handedness as the cholesteric liquid crystal material and which varies with the intensity of the electric field and therefore with the light intensity of the filters light incident surface. This is best exemplified in FIG. 6 where the cholesteric liquid crystal arrangement 46 is shown as being of the left handed type and therefore passing all light except for the left handed light at $\lambda 0$. For purposes herein, it will be assumed that the cholesteric liquid crystal arrangement includes left handed cholesteric liquid crystal material so long as it is understood that such material could readily replaced with right handed cholesteric liquid crystal material in which case the overall optics would change accordingly. Still referring to FIG. 6, the way in which the quarterwave plate 48 and linear polarizer 50 cooperate with the cholesteric liquid crystal arrangement 46 is illustrated. As stated immediately above, the cholesteric liquid crystal arrangement passes all light incident on its surface except for left handed light at $\lambda 0$. The quarterwave plate passes all of the left handed light reaching its incident surface but converts all right handed light to linear light, as diagrammatically illustrated. The linear polarizer allows the left handed light to pass through it but blocks all linear light. Therefore, the output of the linear polarizer which corresponds to the output of the overall notch filter includes only left handed light, absent the left handed light at $\lambda 0$ and therefore functions as a notch filter having its notch at $\lambda 0$. As will be seen below, this notch varies to at least a limited extent with the intensity of light at the incident surface of the overall filter, that is, the incident surface of the cholesteric liquid crystal arrangement independent of the temperature at that surface.

Figure 4:
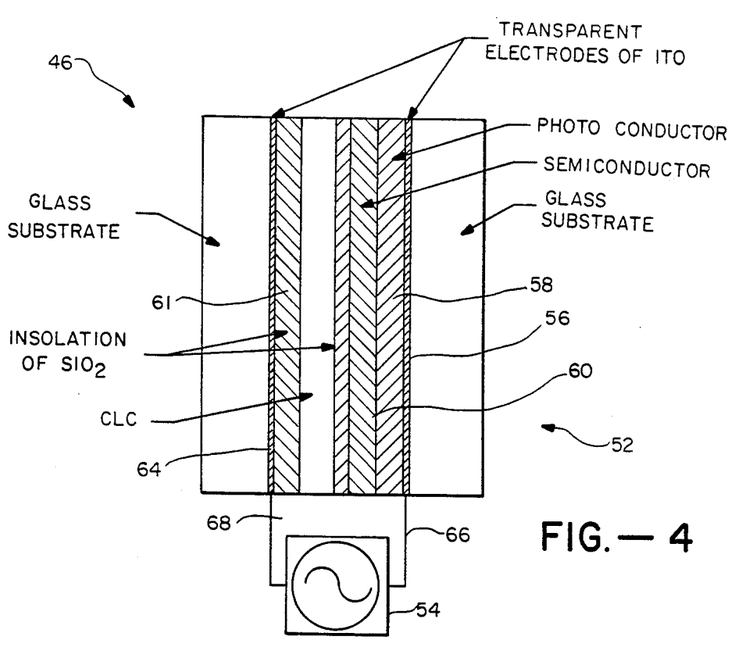
FIG. 4 diagrammatically illustrates a cholesteric liquid crystal arrangement forming part of the notch filter of FIG. 3.

The overall cholesteric liquid crystal arrangement 46 is comprised of a multi-layered component 52 and an AC power source 54. As illustrated in FIG. 4, the multi-layered component 52 includes a front transparent electrode 56 which serves as the light incident surface to the overall notch filter, a photoconductive layer 58, a layer of semiconductive material 60, dielectric layer 62, a layer of cholesteric liquid crystal material 62 and finally a back transparent electrode 64. The two transparent electrodes which may be of any suitable material, for example ITO on glass, are electrically connected to opposite sides of the AC power source by suitable leads 66 and 68. In a device to be built, the photoconductor is Poly-N-Vinyl Carbazola +2, 4, 7-Trinitro-9-Fluorenone, and the layer of semiconductor material is Polyimid or ZnSe.

Figure 5:
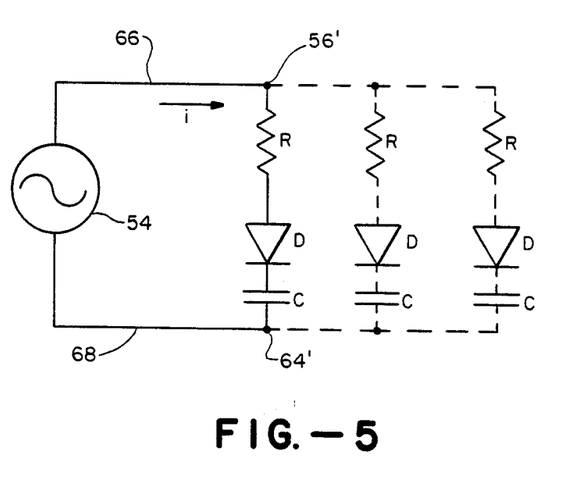
FIG. 5 is an electrical circuit representation of the cholesteric liquid crystal arrangement of FIG. 4.

The way in which overall cholesteric liquid crystal arrangement 46 functions opto-electrically is best illustrated in FIG. 5. The photoconductive layer 58 is represented by the photoresistor R. The photoconductive layer in combination with the layer of semi-conductor material functionally form a pin diode D. The layer of cholesteric liquid crystal material is represented by the capacitor C and, in this regard, a dielectric layer 61 serves to prevent current from flowing through this layer. The dielectric material making up layer 61 may be of any suitable type but is preferably silicon dioxide which is chemically inert in order to protect the cholesteric liquid crystal layer. The photoresistor, pin diode and capacitor are series connected in circuit with the AC power supply 54 by means of leads 66 and 68 and transparent electrodes 56 and 64, the latter being indicated by junctions 56' and 64' respectively, in FIG. 5.

Having described the physical makeup of cholesteric liquid crystal arrangement 46 as illustrated in FIG. 4 and its electro-optical equivalents illustrated in FIG. 5, attention is now directed to the way in which the cholesteric liquid crystal arrangement functions in its role as part of overall notch filter 42. In this regard, it should be remembered that the layer 62 of cholesteric liquid crystal material acts in either a right handed mode or a left handed mode and therefore passes all light except for a narrow band of light of the same handedness as the material itself. As indicated above, it will be assumed that the cholesteric liquid crystal layer is left handed and herefore passes all light except for left handed light in a particular narrow band. For purposes of convenience, this band will be referred to as λ0 where λ0 is actually the center wavelength of the band.

The remaining components making up overall cholesteric liquid crystal arrangement 46 serve as the previously recited electro-optic means for causing the λ0 band to vary, at least to a limited extent, with the intensity of light appearing at the light incident surface of the arrangement, that is, at the surface of transparent electrode 56, independent of the temperature at that surface. The way in which this occurs is a follows. As indicated above, photoconductive layer 58 functions as a photoresistor R. If there is no light at the incident surface of arrangement 46 and therefore no light at the photoresistor R, the resistive value of the resistor R is sufficiently high to prevent current from passing through the series circuit between terminal 56' and 64'. Regardless of the value of resistor R, the diode D draws the current from AC source 54 to pass only in the direction toward terminal 64 from terminal 56. Since the resistor is a photoresistor, its resistive value varies inversely with light intensity at its incident surface, that is, as the intensity of light increases, the resistive value of the resistor decreases. Therefore, as the incident light increases, the current is passing through the resistor from terminal 56' to terminal 64' during corresponding half cycles of the power supply increases proportionately. So long as there is no light at the incident surface and therefore no current is in the circuit, the capacitor C remains uncharged and therefore no electric field is applied across it. This means that no electric field appears across the layer of cholesteric liquid crystal material. However, as the resistive value of resistor R decreases as a result of the increase in light intensity at the incident surface, the current to the capacitor increases thereby charging the latter so as to create an electric field of corresponding intensity across the capacitor and therefore across the layer of cholesteric liquid crystal material. The components making up the overall circuit may be readily selected so that the intensity of this field is directly proportionate to the intensity of light appearing at the incident surface to the overall arrangement 46. At the same time, it is known that the layer of cholesteric liquid crystal material can be selected such that changes in electric field across it will shift the narrow band of light which it blocks. In other words, the notch characteristics of the cholesteric liquid crystal material can be made to vary to at least a limited extent with the intensity of light at the incident surface of the overall arrangement because changes in the incident light cause proportionate changes in the electric field across the layer of cholesteric liquid crystal material. By combining this arrangement with quarter wave plate 48 and linear polarizer 50 in the manner described above, the notch filter and the same shifting type feature results, as described previously.

Overall cholesteric liquid crystal arrangement 46 was described immediately above as if resistor R, diode D and capacitor C represented the entire cross extent of each of the individual layers making up multi-layered component 52. In actual practice, the photoresistor R, diode D and capacitor C represent a relatively small section or pixel of the overall surface extent of each of the layers. Viewed as a whole, there are a relatively large number of these pixels, electrically speaking, in parallel relationship with the power supply, as indicated in part by an additional circuitry illustrated in dotted lines in Figure 5. Each series combination of a resistor R, diode D and capacitor C corresponds to a particular pixel. Therefore, the position of the notch associated with each pixel will depend upon the amount of light at that pixel and therefore the overall notch filter 42 actually functions as multitude of notch filters which in combination with the interference filter 44 serves to compress the light intensity range appearing across the entire light incident surface of the notch.

Figure 7A:
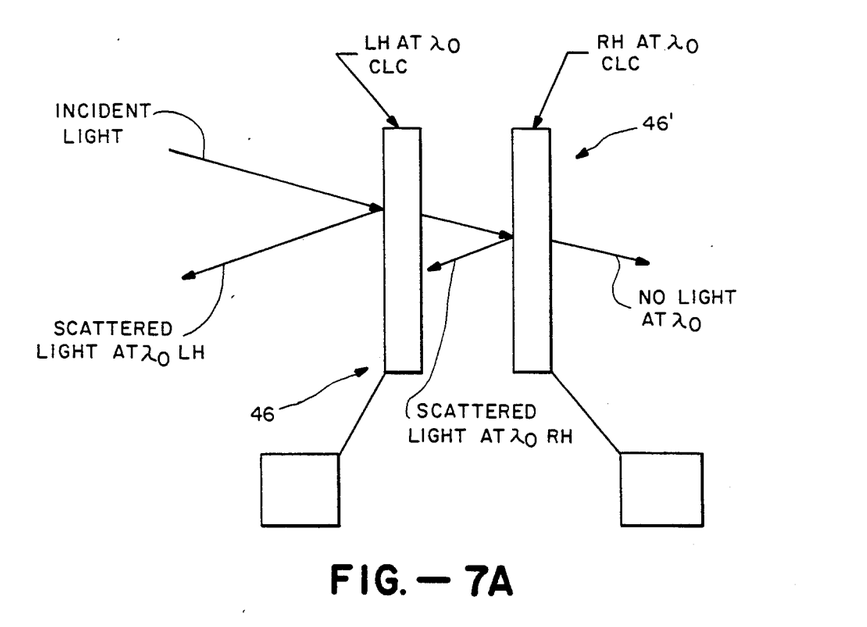
FIGS. 7A, 7B and 8 are diagrammatic illustrations of modified versions of the cholesteric liquid crystal type of notch filter depicted in FIGS. 3 and 6.
Figure 7B:
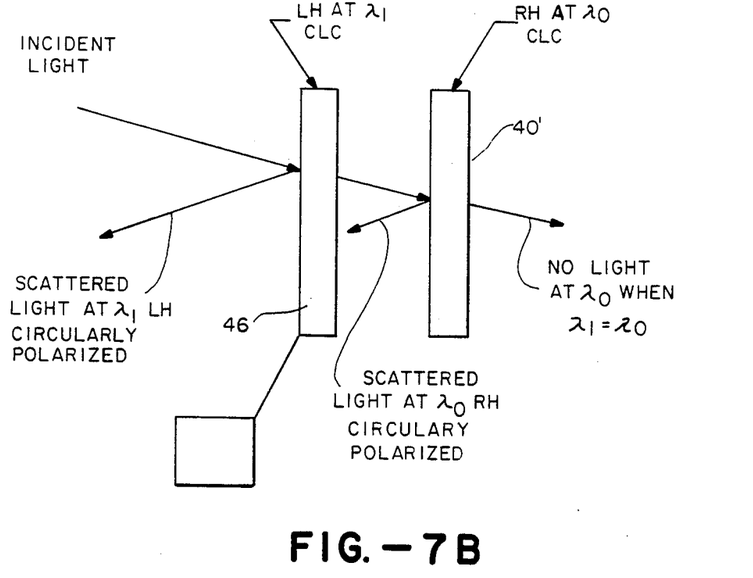

In an system to be built, the various components making up multi-layered component 52 and the power source 54 are as follows:
Transparent layers 56, 64 . . . ITO on low Na glass
Photoconductor 58 . . . PVK 40%+Trimetrofluorenone 60% (TNF)
Cholesteric Liquid Crystal Material . . . COC 90–70%+CC 10–30% by weight
Power Source 54 . . . 1 KHZ 10VAC Having described the way in which cholesteric liquid crystal arrangement 46 functions and the way in which it cooperates with the quarter wave plate 48 and linear polarizer 50 to produce notch filter 42, attention is directed to the way in which arrangment 46 can be used with components other than a quarter wave plate and linear polarizer to produce cholesteric liquid crystal type of notch filters. Specifically, reference is directed to FIGS. 7A and 8. In FIG. 7A, arrangement 46 (using left handed cholesteric liquid crystal material) is combined with arrangement 46' which is identical, except that arrangement 46' includes right handed cholesteric liquid crystal material. Under these conditions, all the light incident on the cholesteric liquid crystal arrangement 46 passes through both arrangements, except for left handed and right handed light at particular wavelengths bands or notches λ0. Theoretically, these latter bands are to shift with incident light, as described above. However, this particular embodiment is not as desirable as the one illustrated in FIGS. 3 and 6. This is because the left handed notch and the right handed notch of the two cholesteric liquid crystal arrangements must shift together in order for the notch filter to tune smoothly and that is difficult to do. It would require that the same light pattern appear at the incident surface of each cholesteric liquid crystal arrangement or that the components making up these arrangements be carefully selected so that the light that passes through cholesteric liquid crystal arrangement 46 causes the notch of arrangement 46' to shift in precisely the same way that the notch is shifted in arrangement 46. Instead of relying on tuning the notch wavelength this device could be arranged to create and destroy the vertical wavelength. This device is shown in 7B. It has only the first (LH) CLC sensitive to input light that can shift its scattering wavelength and the second (RH) CLC scattering wavelength is fixed, with no input image or drive circuit off hence no appted field on LH CLC one can see through the serial LC's at all wavelengths. At the wavelength of each CLC scattering 50% of the light transmits at each CLC scattering 50% of the light transmits at each circular polarization. But if each CLC scattering wavelength is made to be at the same wavelength then no light transmits through the serial CLC's. The intensity compression is thus absorbed through a NBIF at the RH (CLC) wavelength. As the scattering wavelengths of the LH (CLC) is shifted in response to an input image n the surface it aligns in wavelength to the RH (CLC) and a reduction in light transmission at the NBIF wavelength is absorbed which is proportional to the input light.

Figure 8:
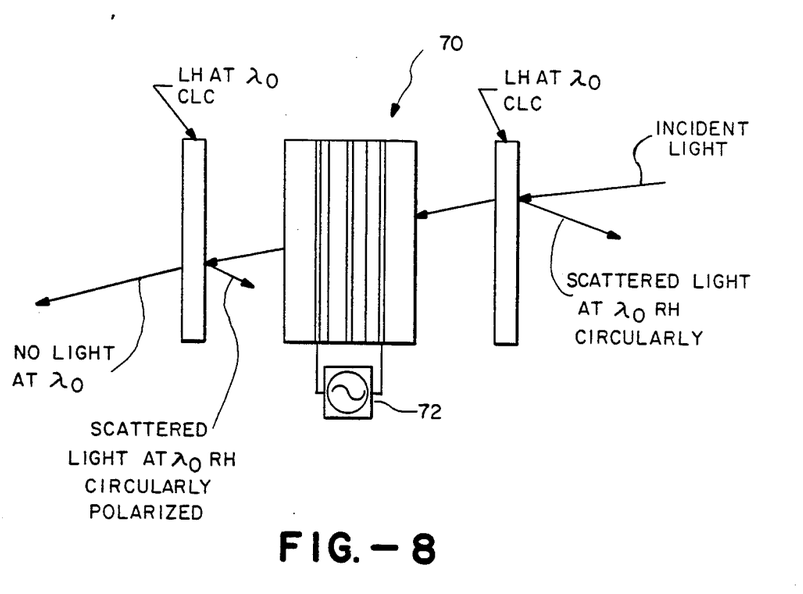

In the approach illustrated in FIG. 8, a layer of left handed cholesteric liquid crystal material 62 is combined with a layer of pneumatic liquid crystal material 70 and a second layer of left handed cholesteric liquid crystal material 62. The pneumatic liquid crystal is either turned on or off, as schematically represented by the on/off switch 72. This overall arrangement operates like 7B in that the device creates and destroys the notch as λ.

Rather then turning the notch past a monitoring narrow band filter. The notch creation occurs when item 70 in FIG. 8 switches in a smooth manner from a quarter wave plate to a half wave plate. When 70 is a half wave plate RH light becomes LH light scattered by the second CLC (λLH) thus the system does not transmit at λ. If the item 70 is now made a quarter plate then LH light becomes linear or RH light and can then transmit through the second LH (CLC) at 62.

What is claimed is:

1. In a liquid crystal notch filter configured to pass light at all wavelengths except a relatively narrow wavelength band which defines the filter's notch, the improvement comprising means for causing said notch to vary to at least a limited extent with the intensity of light at its light incident surface, independent of the temperature at that surface.

2. The improvement according to claim 1 wherein said means includes a cholesteric liquid crystal arrangement including a layer of cholesteric liquid crystal material of either left or right handedness and electro-optic means for applying across said layer an electric field which is proportional to the light intensity at said incident surface, said cholesteric liquid crystal material being configured to pass light of both right and left handedness and at all wavelengths, except for a narrow wavelength band of light which is of the same handedness as said cholesteric liquid crystal material and which varies with the intensity of said electric field and therefor with the light intensity at the filter's light incident surface.

3. The improvement according to claim 2 wherein said first mentioned means includes light filtering means optically in series with said layer of cholesteric liquid crystal material for passing only light of the same handedness as said material, whereby the combination of said cholesteric liquid crystal material and said light filtering means passes all wavelengths of light at a particular handedness, except for said last-mentioned narrow band which serves as said notch.

4. The improvement according to claim 3 wherein said light filtering means includes a quarter wave plate optically in series with and immediately downstream of said cholesteric liquid crystal arrangement and a linear polarizer optically in series with and immediately downstream of said quarterwave plate.

5. The improvement according to claim 2 wherein said first-mentioned means includes a second cholesteric liquid crystal arrangement including a second layer of cholesteric liquid crystal material of the opposite handedness as said first-mentioned layer optically in series with and downstream of said first-mentioned cholesteric liquid crystal arrangement, and means for applying across said second layer an electric field which at all times during the operation of the filter is equal to the field across said first-mentioned layer.

6. The improvement according to claim 2 wherein said electro-optic means includes a plurality of layers of materials in stacked relationship with one another and with said layer of cholesteric liquid crystal and a source of AC voltage connected predetermined ones of said layers such that an electrical circuit is formed with said AC voltage as its source, said plurality of layers together forming a photoresponsive resistor and diode electrically connected in series with said source and said layer of cholesteric liquid crystal material which serves as a capacitor in the circuit, said circuit operating in a way which places an electric field across the capacitor in proportion to the light intensity appearing at the photoresponsive resistor.

7. The improvement according to claim 1 wherein said liquid crystal notch filter includes a layer of cholesteric liquid crystal material and wherein said notch varying means includes means for applying an electrical field across said layer of cholesteric liquid crystal material in proportion to the intensity of light at the incident surface of the filter.

8. In a method of filtering light by means of a liquid crystal notch filter configured to pass light at all wavelengths except a relatively narrow wavelength band which defines the filter's notch, the improvement comprising the step of causing the notch to vary to at least a limited extent with the intensity of light at its incident surface.

9. The improvement according to claim 8 wherein said liquid crystal notch filter includes a layer of cholesteric liquid crystal material and wherein said notch varying step includes the step of applying an electrical field across said layer of cholesteric liquid crystal material in proportion to the intensity of light at the incident surface of the filter.

10. In a system in which an object having a given light intensity range is viewed, an assembly for compressing said light intensity range comprising means defining an input for receiving the uncompressed light intensity range and an output, and light filtering means located between said input and output responsive to said uncompressed light intensity range for filtering said range in a way which causes the light passing therethrough to display a compressed light intensity range, said filtering means including a thermally responsive liquid crystal notch filter and an interference filter positioned in serial relationship with one another with the liquid crystal notch filter being disposed in front of said interference filter, said notch filter being configured to pass light at all wavelengths except a relatively narrow wavelength band and including means for causing said notch to vary to at least a limited extent with the intensity of light at its incident surface.

11. An assembly according to claim 10 wherein said notch varying means includes a cholesteric liquid crystal arrangement including a layer of cholesteric liquid crystal material of either left or right handedness and electro-optic means for applying across said layer an electric field which is proportional to the light intensity at said incident surface, said cholesteric liquid crystal material being configured to pass light of both right and left handedness and at all wavelengths, except for a narrow wavelength band of light which is of the same handedness as said cholesteric liquid crystal material and which varies with the intensity of said electric field and therefore with the light intensity at the filter's light incident surface.

12. An assembly according to claim 11 wherein said notch varying means includes light filtering means optically in series with said layer of cholesteric liquid crystal material for passing only light of the same handedness as said material, whereby the combination of said cholesteric liquid crystal material and said light filtering means passes all wavelengths of light at a particular handedness, except for said last-mentioned narrow band which serves as said notch.

13. An assembly according to claim 12 wherein said light filtering means includes a quarterwave plate optically in series with and immediately downstream of said cholesteric liquid crystal arrangement and a linear polarizer optically in series with and immediately downstream of said quarterwave plate.

14. An assembly according to claim 11 wherein said notch varying means includes a second cholesteric liquid crystal arrangement including a second layer of cholesteric liquid crystal material at the opposite handedness as said first-mentioned layer, optically in series with and downstream of said first-mentioned cholesteric liquid crystal arrangement, and means for applying across said second layer an electric field which at all times during the operation of the filter is equal to the field across aid first-mentioned layer.

15. An assembly according to claim 11 wherein said electro-optic means includes a plurality of layers of materials in stacked relationship with one another and with said layer of cholesteric liquid crystal and a source of AC voltage connected predetermined ones of said layers such that an electrical circuit is formed with said AC voltage as its source, said plurality of layers together forming a photoresponsive resistor and diode electrically connected in series with said source and said layer of cholesteric liquid crystal material which serves as a capacitor in the circuit, said circuit operating in a way which places an electric field across the capacitor in proportion t the light intensity appearing at the photoresponsive resistor.

16. The improvement according to claim 10 wherein said liquid crystal notch filter includes a layer of cholesteric liquid crystal material and wherein said notch varying means includes means for applying an electrical field across said layer of cholesteric liquid crystal material in proportion to the intensity of light at the incident surface of the filter.

* * * * *